US012181134B2

(12) United States Patent
Gross et al.

(10) Patent No.: US 12,181,134 B2
(45) Date of Patent: Dec. 31, 2024

(54) FOCUS ADJUSTABLE LED STEP LIGHT DEVICES

(71) Applicant: Lighting & Supplies, Inc., Brooklyn, NY (US)

(72) Inventors: Joel Gross, Brooklyn, NY (US); John Luk, Flushing, NY (US)

(73) Assignee: Lighting & Supplies, Inc., Brooklyn, NY (US)

( * ) Notice: Subject to any disclaimer, the term of this patent is extended or adjusted under 35 U.S.C. 154(b) by 32 days.

(21) Appl. No.: 18/109,083

(22) Filed: Feb. 13, 2023

(65) Prior Publication Data

US 2023/0258321 A1 Aug. 17, 2023

Related U.S. Application Data

(60) Provisional application No. 63/309,063, filed on Feb. 11, 2022.

(51) Int. Cl.

| | |
|---|---|
| ***F21V 19/02*** | (2006.01) |
| ***F21S 8/02*** | (2006.01) |
| ***F21V 7/10*** | (2006.01) |
| ***F21V 17/16*** | (2006.01) |
| ***F21V 19/00*** | (2006.01) |
| ***F21V 23/00*** | (2015.01) |
| ***F21V 23/04*** | (2006.01) |

(Continued)

(52) U.S. Cl.

CPC .............. *F21V 19/02* (2013.01); *F21S 8/022* (2013.01); *F21V 7/10* (2013.01); *F21V 17/16* (2013.01); *F21V 19/003* (2013.01); *F21V 23/009* (2013.01); *F21V 23/04* (2013.01); *F21V 29/70* (2015.01); *F21W 2111/027* (2013.01); *F21Y 2115/10* (2016.08)

(58) Field of Classification Search

CPC . F21V 19/02; F21V 7/10; F21V 17/16; F21V 19/003; F21V 23/009; F21V 23/04; F21V 29/70; F21S 8/022; F21S 8/024; F21W 2111/027; F21Y 2115/10

See application file for complete search history.

(56) References Cited

U.S. PATENT DOCUMENTS 8,419,205 B1 * 4/2013 Schmuckle ........... F21V 33/006 362/370
8,563,898 B1 * 10/2013 Wright ................. B60Q 1/0017 219/202

(Continued)

*Primary Examiner* — Zheng Song
*Assistant Examiner* — Glenn D Zimmerman
(74) *Attorney, Agent, or Firm* — Bochner PLLC; Andrew D. Bochner; Eric R. Kleinertz

(57) ABSTRACT

An LED step light may include a junction box. An LED step light may include an LED light head assembly, including: a clip strap, a driver box, a cover, a reflector cover, wherein the clip strap couples together the driver box, the cover, and the reflector cover. An LED step light may include a heat sink reflector, wherein the heat sink reflector is disposed within an interior of the reflector cover. An LED step light may include a pan rotation ring. An LED step light may include a ball plunger, wherein the ball plunger may be attached to the reflector cover, and may be configured to interface with the pan rotation ring to allow for rotation of the LED light head assembly. An LED step light may include a main plate. An LED step light may include a face cover plate.

19 Claims, 14 Drawing Sheets

(51) Int. Cl.
*F21V 29/70* (2015.01)
*F21W 111/027* (2006.01)
*F21Y 115/10* (2016.01)

(56) References Cited

U.S. PATENT DOCUMENTS

| | | | | |
|---|---|---|---|---|
| D819,247 | S * | 5/2018 | Li | D26/72 |
| 11,274,821 | B2 * | 3/2022 | Danesh | F21V 5/04 |
| 11,473,764 | B1 * | 10/2022 | Luk | F21V 23/008 |
| 2007/0019418 | A1 * | 1/2007 | Czech | F21V 21/30<br>362/364 |
| 2012/0320594 | A1 * | 12/2012 | Chien | F21V 3/00<br>362/249.03 |

* cited by examiner

FOCUS ADJUSTABLE LED STEP LIGHT DEVICES

FIELD OF THE INVENTION

The present disclosure relates to a lighting device to focus light to a desired area to illuminate a stairway, walkway, or pathway for personal safety.

INTRODUCTION

Dedicated hard-wired stair step lights are presently used to illuminate walkways, patios, decks, and step stairs either from the side or in the front riser to prevent accidents by persons tripping or falling from dark pathways.

The step lights can be easily mounted into recessed single-gang gem type junction boxes with all types of decorative trims and finishes. They can also be dedicated surface mounted step light fixtures that are mounted on a wall or stairway riser as well.

In the case of recessed stairway step lights, the single-gang gem type junction box may be randomly installed in a horizontal or vertical position depending on the direction of the power wire feeding the recessed step light. Presently, recessed stairway step lights are manufactured for installation in either a horizontal position or in a vertical position. The horizontal or vertical positioning of the junction box typically dictates the use of a fixed horizontal or vertical step light, thereby causing possible confusion and limits the types of steps lights that can be used for a particular application.

There are also some recessed LED step light fixtures in the market today that allow the square or rectangular light engine module to be manually removed from the front mounting face plate and physically rotated 90-degrees and secured back onto the face plate to allow this recessed LED step light to be installed in a horizontal or vertical positioned single-gang gem type junction box.

In addition, stairwell steps and walkways may come in different lengths. Most all step light fixtures in the market today have fixed focuses, so a user may have to use additional step light fixtures to cast light on a wider area sometimes having two step light fixtures installed in opposing sides of the stairs or walkways or on the stair step rising thereby increasing costs for acquiring the products as well as paying for the added installation fees.

There becomes a need for a single universal use stair step light that can be easily adjusted without having to take apart the step light fixture for vertical and horizontal positioning, and any position in between.

There is also a need to focus the desired light on to specific and dedicated areas without causing unwanted and possible blinding light glare.

There is another need for a universally focusable step light that can be used in both indoor and outdoor applications.

There is also a need to have one universal step light that can be used for both short and long light throw to cover a wider range of pathways and stair lengths.

There is also another need for a universal step light that will allow a user to use less fixtures of the present disclosure and save on acquisition costs and energy use.

Lastly, there is yet another need to provide a dimmable LED step light that can provide lower light intensity and additional energy savings.

The present disclosure overcomes these drawbacks, and provides many other advantages, benefits, and improvements.

SUMMARY OF THE INVENTION

Aspects of the present disclosure relate to an LED step light including: a junction box; an LED light head assembly, including: a clip strap; a driver box; a cover; a reflector cover, wherein the clip strap couples together the driver box, the cover, and the reflector cover; a heat sink reflector, wherein the heat sink reflector is disposed within an interior of the reflector cover; a pan rotation ring; a ball plunger, wherein the ball plunger is attached to the reflector cover, and is configured to interface with the pan rotation ring to allow for rotation of the LED light head assembly; a main plate; and a face cover plate.

Aspects of the present disclosure relate to a LED step light, further including: a dimmer circuit configured to allow for adjustable dimming of the LED step light.

Aspects of the present disclosure relate to a LED step light, further including: a color controller connected to the LED step light, the color controller configured to adjust the color of the LED step light.

Aspects of the present disclosure relate to a LED step light, wherein the color controller is operated by a physical switch located on a surface of the driver box.

Aspects of the present disclosure relate to a LED step light, further including: a dimmer circuit connected to the LED light sources and the power source, the dimmer circuit configured to adjust the brightness of the LED light sources.

Aspects of the present disclosure relate to a LED step light, wherein the dimmer circuit and the color controller are integrated into a single unit.

Aspects of the present disclosure relate to a LED step light, wherein the color controller is operated by a physical switch located on a surface of the driver box.

Aspects of the present disclosure relate to a LED step light, wherein the color controller is operated by a physical switch located on a surface of the driver box.

Aspects of the present disclosure relate to a LED light fixture, wherein the housing is configured for ceiling or wall mounted installation.

These and other aspects, features, and advantages of the present disclosure will become more readily apparent from the following attached drawings and the detailed description of the preferred embodiments.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION

Figure 1A:
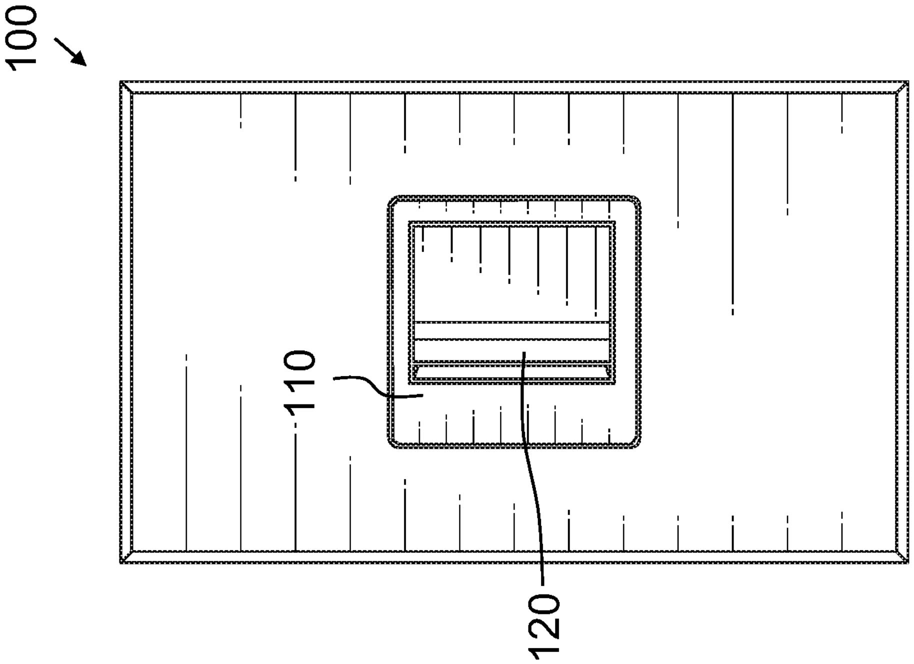
FIG. 1A is a front view of the LED step light described in FIG. 1 where the LED light head is now configured to be mounted in a horizontal position into a vertically mounted junction box with the LED light now focused to one side towards a stairway step.
Figure 1:
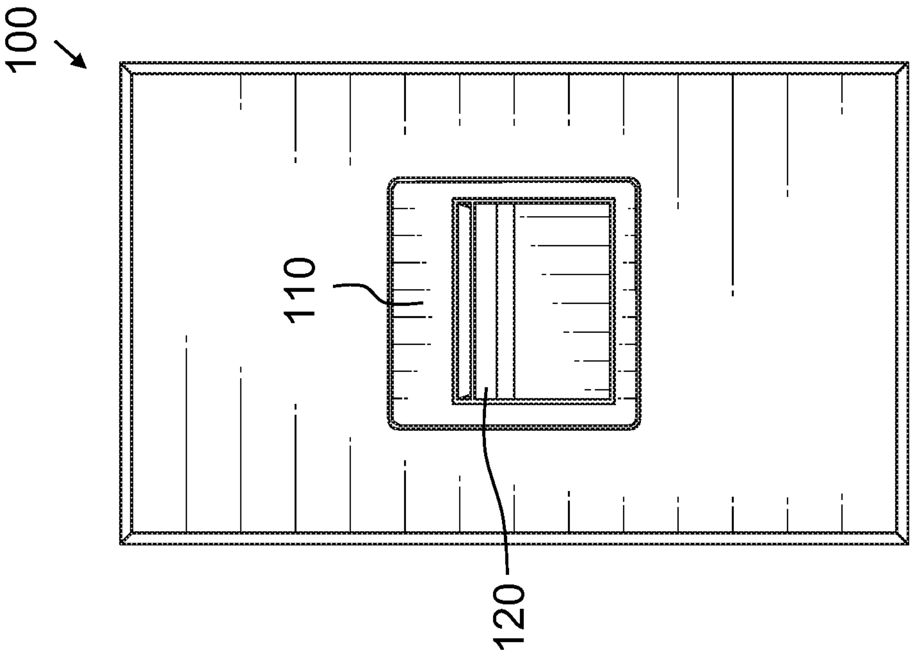
FIG. 1 is a front view of an LED step light where the LED light head is configured to be mounted in a vertical position into a vertically mounted junction box with the LED light focused downwards towards a stairway step.

FIG. 1 shows a front view of an LED step light 100. The LED light head 110 may be configured to be mounted in a vertical position into a vertically mounted junction box (not shown). In such an embodiment, the LED light 120 may be focused downwards towards a stairway step (not shown).

FIG. 1A shows a front view of the LED step light 100 described in FIG. 1. The LED light head 110 may be configured to be mounted in a horizontal position into a vertically mounted junction box (not shown). In such an embodiment, the LED light 120 may be focused to one side towards a stairway step (not shown).

Figure 2:
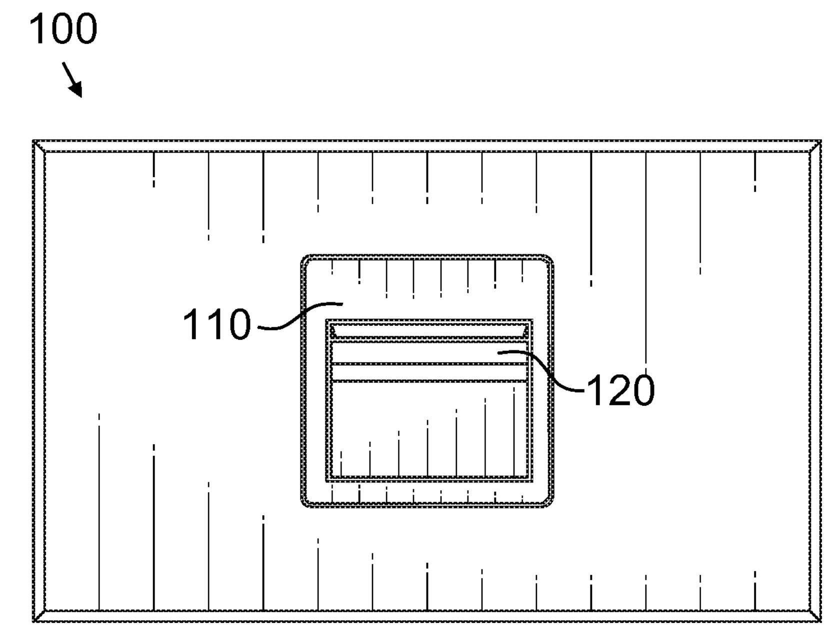
FIG. 2 is a front view of the LED step light described in FIG. 1, which has been manually set such that the LED light head is now configured to be mounted in a vertical position into a horizontally mounted junction box with the LED light now focused downwards towards a stairway step.

FIG. 2 is a front view of the LED step light 100 described in FIG. 1. The LED step light 100 may be manually set such that the LED light head 110 is configured to be mounted in a vertical position into a horizontally mounted junction box (not shown). In such an embodiment, the LED light 120 may be focused downwards on a stairway step (not shown).

Figure 2A:
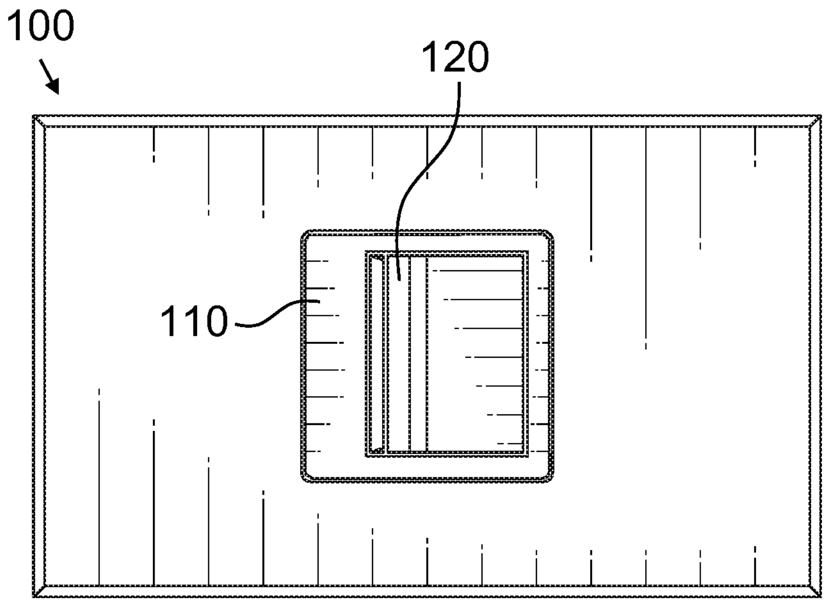
FIG. 2A is a front view of the LED step light described in FIG. 1, which has been manually set such that the LED light head is now configured to be mounted in a horizontal position into a horizontally mounted junction box with the LED light 120 now focused to one side towards a stairway step.

FIG. 2A is a front view of the LED step light 100 described in FIG. 1. The LED step light 100 may be manually set such that the LED light head 110 is configured to be mounted in a horizontal position into a horizontally mounted junction box (not shown). In such an embodiment, the LED light 120 may be focused to one side towards a stairway step (not shown).

Figure 3:
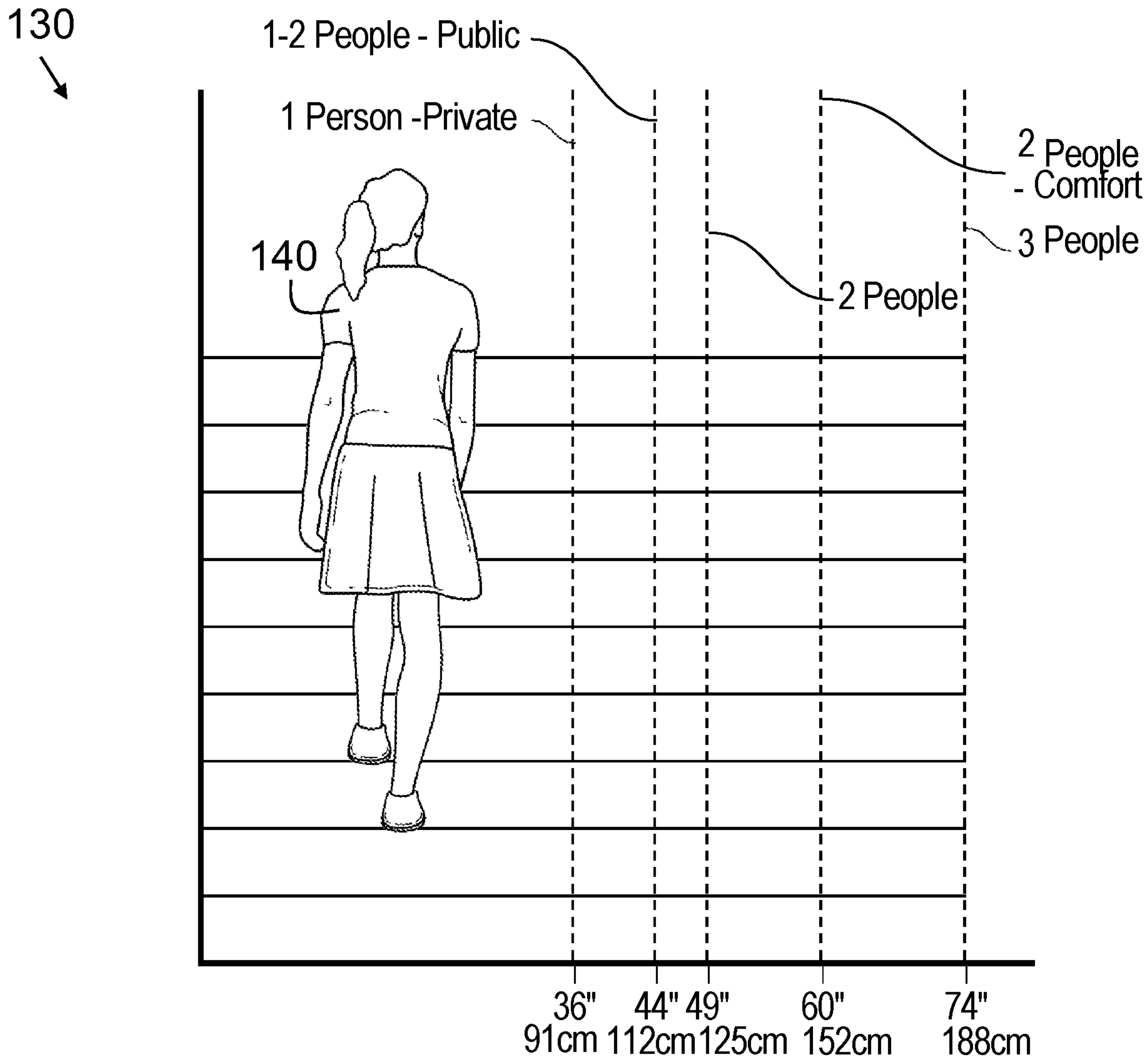
FIG. 3 is a diagram showing the different possible stair step widths for the safe passage of 1, 2, and 3 persons abreast of each other.

FIG. 3 is a diagram showing different stair step lengths 130 for the safe passage of 1, 2, and 3 persons 140 abreast of each other. The diagram shows that, for a single person, the typical length of a stair step may be 36" or 91 cm across; 49" or 125 cm for two people; and 74" or 188 cm for three people passing side by side.

Figure 4:
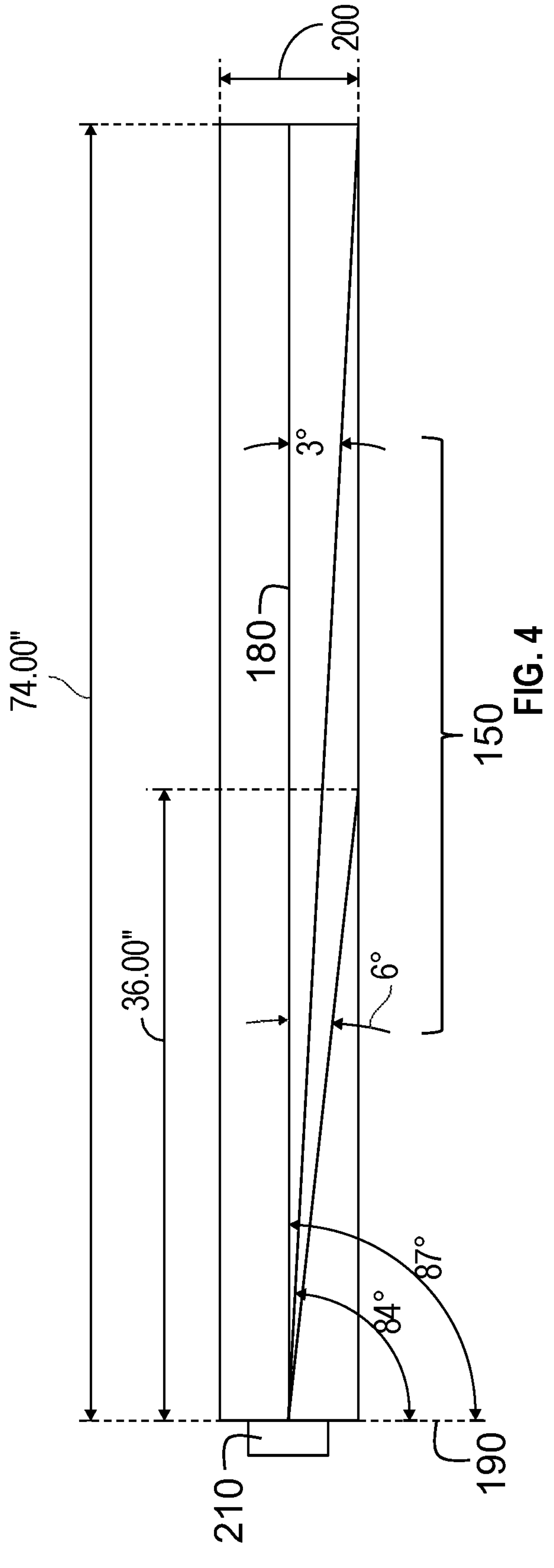
FIG. 4 is a drawing showing the different mounting locations of a typical step light of the present disclosure to project light onto the different widths of steps as shown in FIG. 3.

FIG. 4 is a drawing showing different tilt angles 150 of a typical LED step light 210 of the present disclosure to focus project light onto different stair step lengths 130 as shown in FIG. 3. FIG. 4 illustrates a tilt angle of 3-degrees from horizontal line 180 or 87-degrees from vertical line 190 to focus project light to a stair step length of 74" for three people passing side by side; and a tilt angle of 6-degrees from horizontal line 180 or 84-degrees from vertical line 190 to focus project light to a stair step length of 36" for a single person. The stairway step riser height 200 may typically be at 7⅞" or 7.875".

Figure 5:
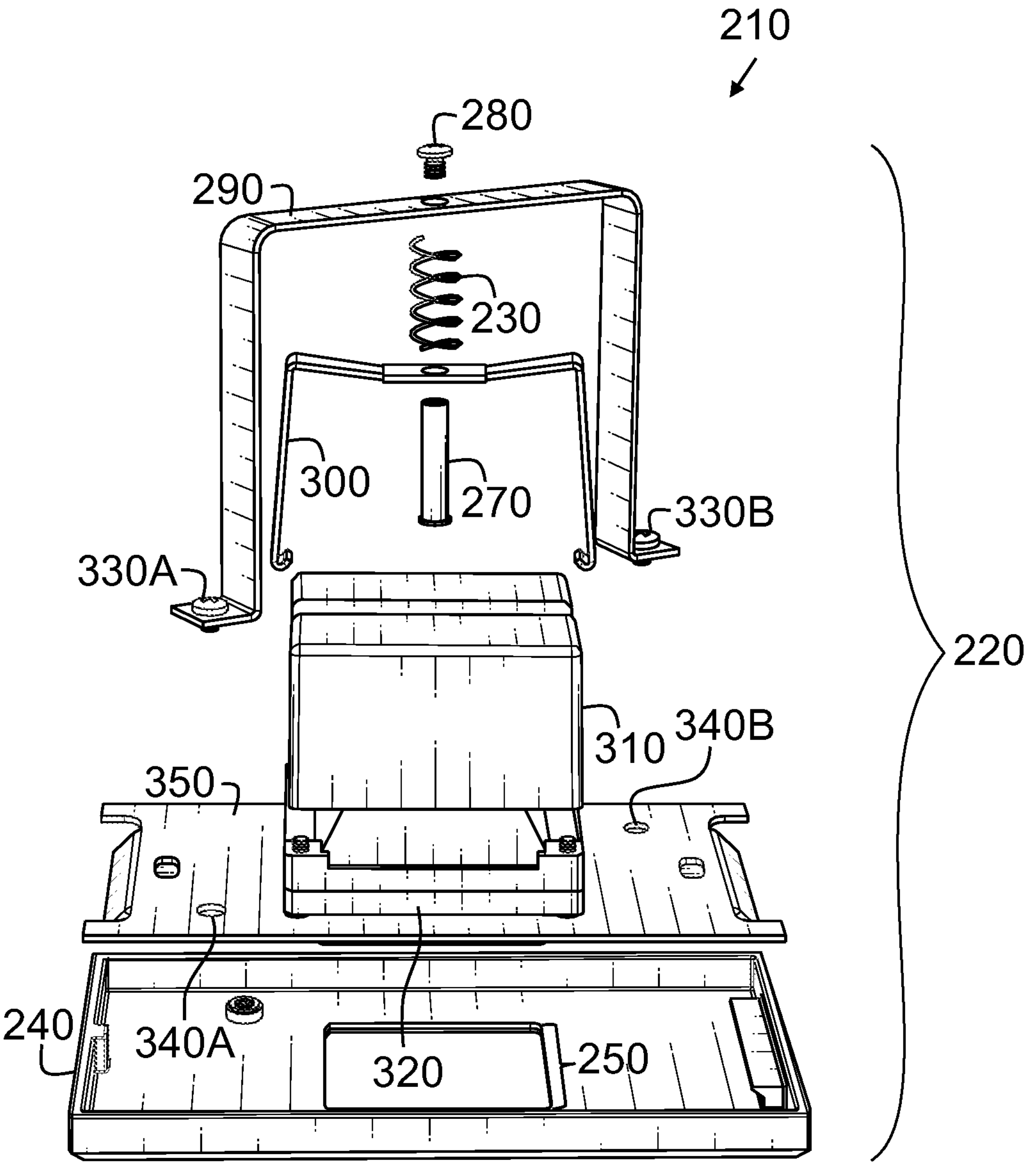
FIG. 5 is an isometric exploded view of one first embodiment of the present disclosure that is an improvement over the step light shown in FIG. 1 and FIG. 2 showing the primary mechanism includes a single unitary top retractable spring locking means and open face cover in a square shape for a vertical or horizontal installation, i.e., 0 or 90 degrees of pan rotation with no tilt adjustment.

FIG. 5 is an isometric exploded view of an embodiment of the present disclosure. Such an embodiment is an improvement over the LED step light 100 shown in FIGS. 1-2. LED step light 210 may include a primary mechanism 220 which may include a single unitary top retractable spring 230, locking means, and face cover plate 240. The cover plate 240 may include a square shape opening 250 for a vertical or horizontal installation (i.e., 0 or 90 degrees of pan rotation with no tilt adjustment). Retractable spring 230 may slide onto threaded standoff 270. Standoff 270 may sit on top of a spring clip strap 300 to secure a driver box 310 to an LED light head 320. A small electrical LED driver (not shown) may be housed inside driver box 310. Lockdown screw 280 may secure the threaded standoff 270 to a rotation support bracket 290. Rotation support bracket 290 may be mounted to a support plate 350 by screws 330A/300B. Screws 330A/330B may be attached to thread nuts 340A/340B respectively that may be pressed into the underside of support plate 350 for a secure hold of the primary mechanism 220.

Figure 5A:
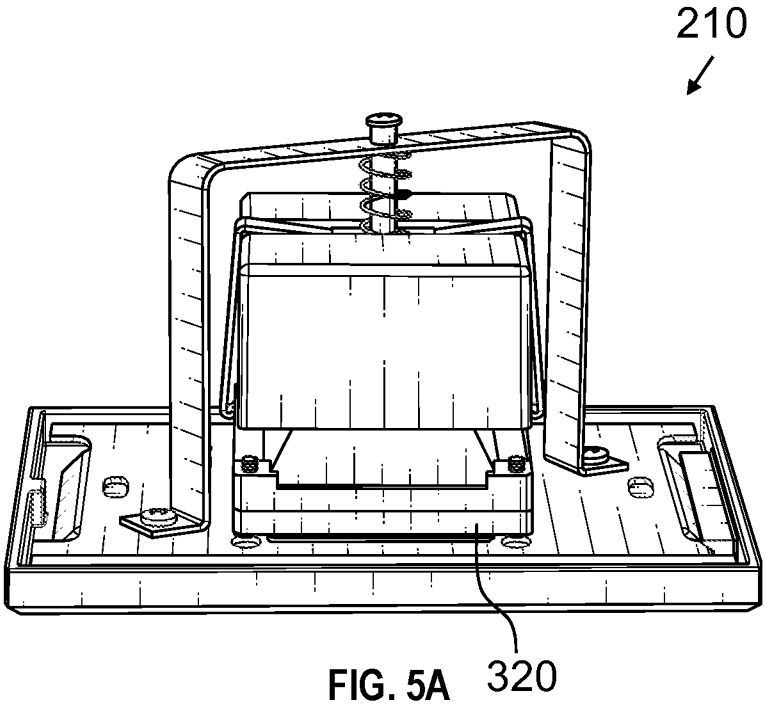
FIG. 5A is an isometric assembled view of the first embodiment described in FIG. 5 now showing the LED light head in a first down vertical position for the LED step light of the present disclosure.

FIG. 5A shows an isometric assembled view of the embodiment described in FIG. 5 now showing the LED light head 320 in a first down vertical position for the LED step light 210 of the present disclosure.

Figure 5B:
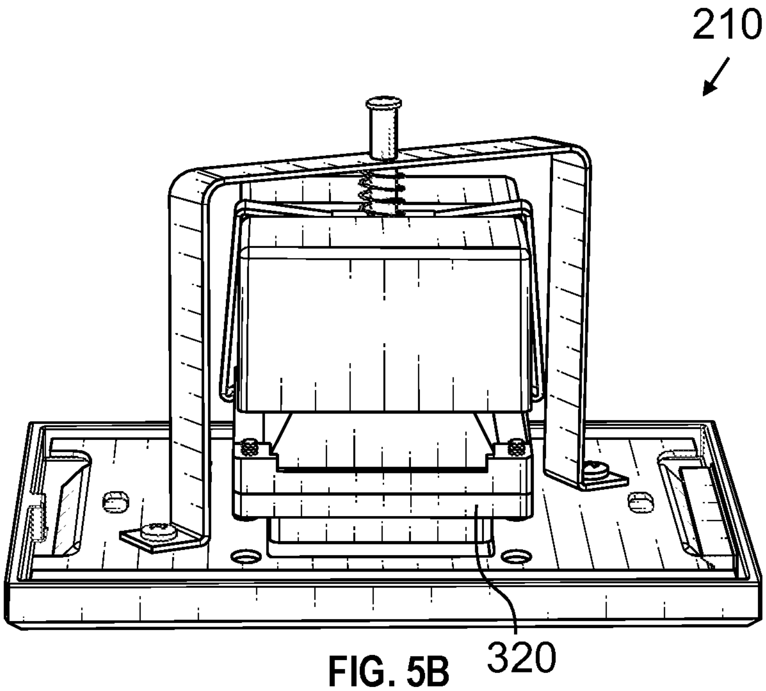
FIG. 5B is an isometric assembled view of the first embodiment described in FIG. 5A now showing the LED light head in a first up vertical position for the LED step light of the present disclosure.

FIG. 5B shows an isometric assembled view of the embodiment described in FIG. 5A now showing the LED light head 320 in a first up vertical position for the LED step light 210 of the present disclosure.

Figure 5C:
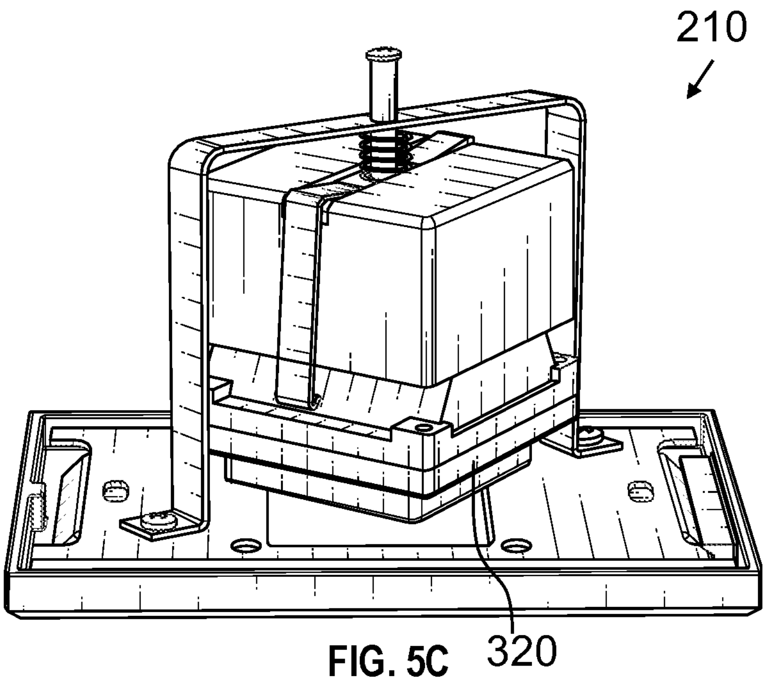
FIG. 5C is an isometric assembled view of the first embodiment described in FIG. 5B now showing the LED light head in a counter-clockwise rotation for the LED step light of the present disclosure.

FIG. 5C is an isometric assembled view of the embodiment described in FIG. 5B now showing the LED light head 320 in a counter-clockwise rotation for the LED step light 210 of the present disclosure.

Figure 5D:
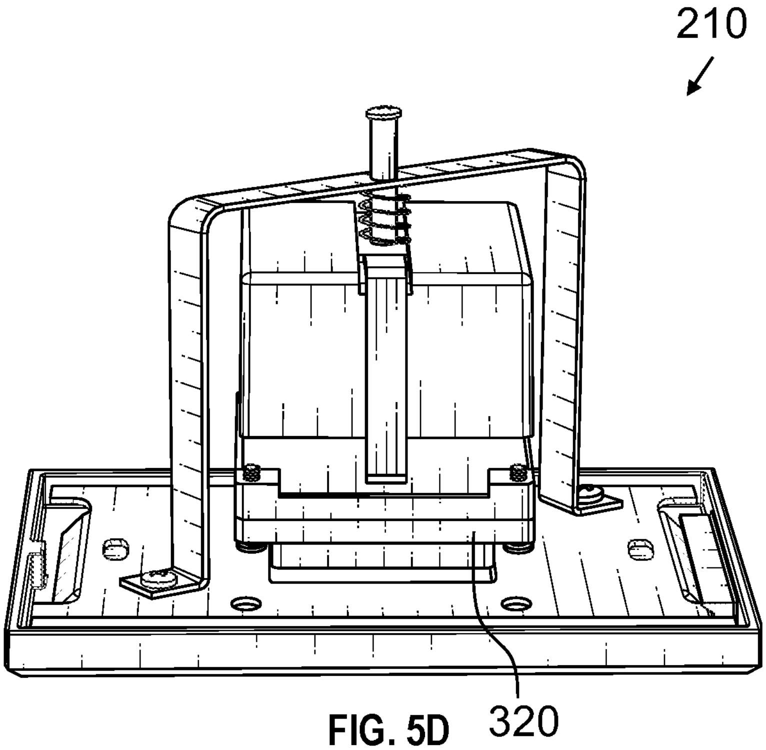
FIG. 5D is an isometric assembled view of the first embodiment described in FIG. 5C now showing the LED light head in a second up horizontal position for the LED step light of the present disclosure.

FIG. 5D shows an isometric assembled view of the embodiment described in FIG. 5C now showing the LED light head 320 in a second up horizontal position for the LED step light 210 of the present disclosure.

Figure 5E:
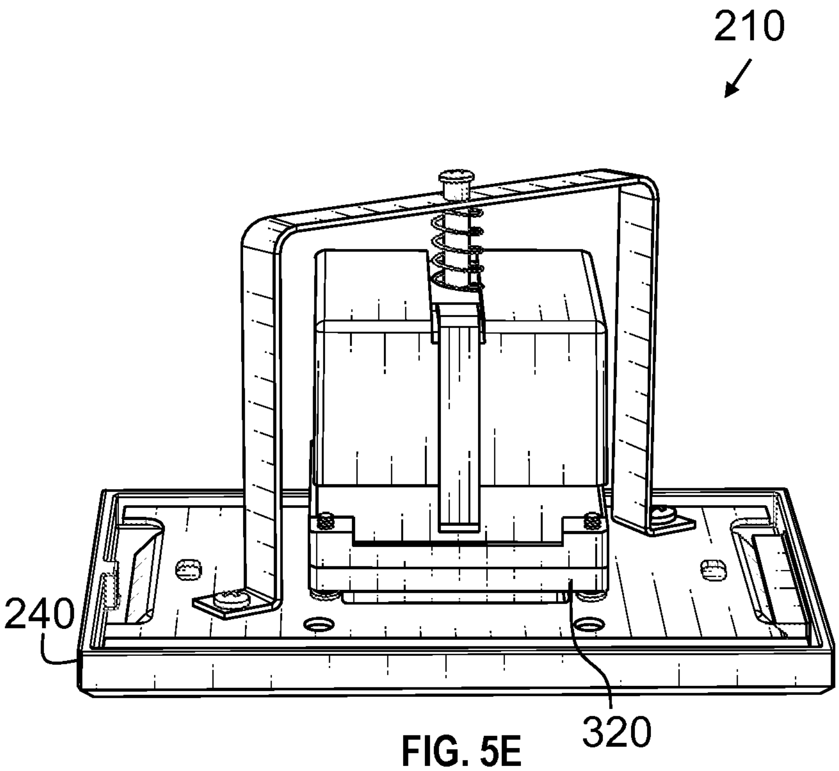
FIG. 5E is an isometric assembled view of the first embodiment described in FIG. 5D now showing the LED light head in a second down horizontal position for the LED step light of the present disclosure.

FIG. 5E shows an isometric assembled view of the embodiment described in FIG. 5D now showing the LED light head 320 in a second down horizontal position for the LED step light 210 of the present disclosure.

Figure 5F:
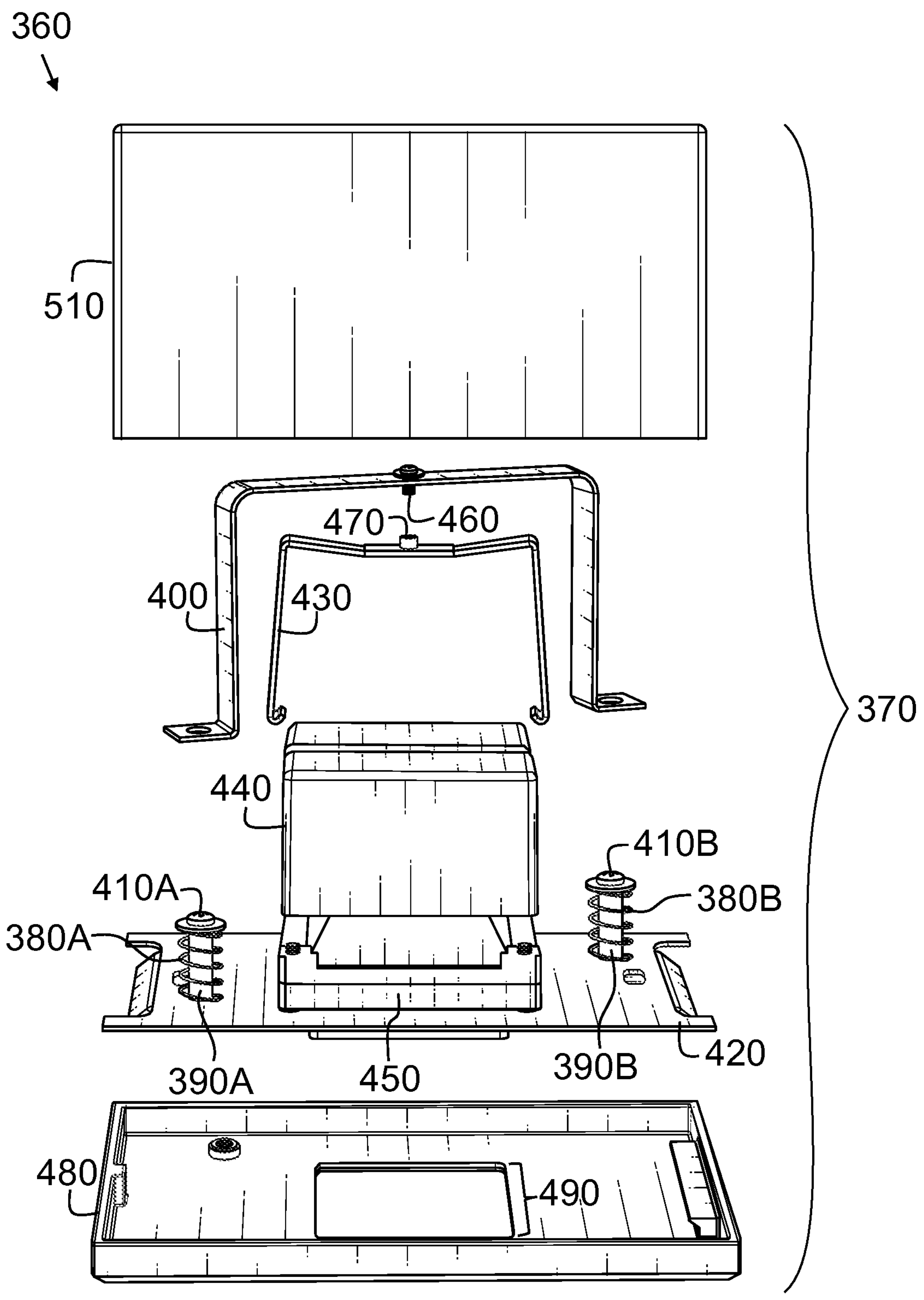
FIG. 5F is an alternate isometric exploded view of the first embodiment described in FIG. 5 now showing the primary mechanism includes two side retractable spring locking means and open face cover in a square shape for a vertical or horizontal installation, i.e., 0 or 90 degrees of pan rotation with no tilt adjustment.

FIG. 5F shows an isometric exploded view of an embodiment of an LED step light 360. The LED step light 360 may include a primary mechanism 370. The primary mechanism 370 may include two side retractable spring 380A/380B, locking means, and open face cover plate 480 in a square shape 490 for a vertical or horizontal installation, i.e., 0 or 90 degrees of pan rotation with no tilt adjustment. Side retractable springs 380A/380B may slide onto respective threaded standoffs 390A/390B. Threaded standoffs 390A/390B may sit at the two bottom feet of rotation support bracket 400 and may be secured by screws 410A/410B respectively onto support plate 420. The spring clip strap 430 used to secure driver box 440 to LED light head 450 may be fixedly attached to rotation support bracket 400 by unitary screw 460 onto threaded nut 470 on top of spring clip strap 430. A small electrical LED driver (not shown) may be housed inside driver box 440. Entire primary mechanism 370, driver box 440, LED light head 450, and support plate 420 may all be assembled and fit into the junction box 510.

Figure 6:
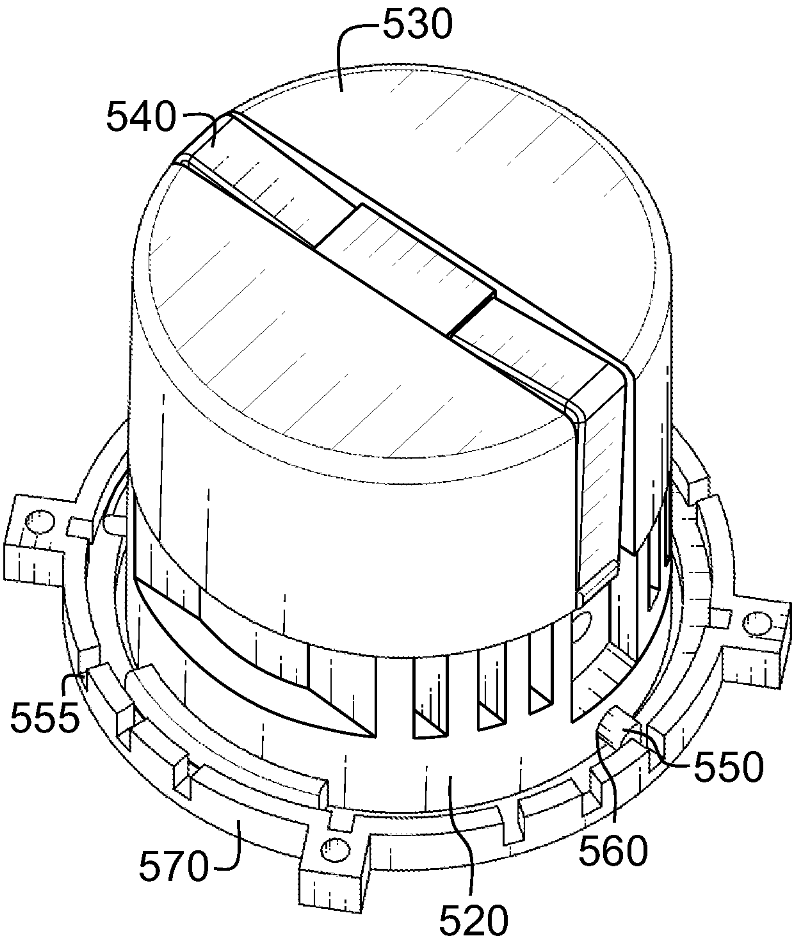
FIG. 6 is an isometric assembled view of a second embodiment of the present disclosure showing a round LED light head where the isolated mechanism includes dedicated detent rotations of the LED light head to specific angles including at least fixed 0-, 15-, 30-, 45-, 60-, 75-, and 90-degrees pan rotations, up to and including 105-, 120-, 135-, 150-, 165-, and 180-degrees fixed positions with no tilt adjustment.

FIG. 6 shows an isometric assembled view of an embodiment of the present disclosure showing a round LED light head 520. The LED light head 520 may include a driver box 530 and spring clip strap 540 securing driver box 530 to the top of LED light head 520. Also shown in FIG. 6 is an isolated mechanism including at least one ball plunger 550 in contact with dedicated detent recessed cavity 560 of the LED light head 520 to specific positioning angles indicating at least fixed 0-, 15-, 30-, 45-, 60-, 75-, and 90-degrees pan rotations, up to and including 105-, 120-, 135-, 150-, 165-, and 180-degrees fixed pan locations as the LED light head 520 is rotated within pan rotation ring 570 with no tilt adjustment of LED light head 520. The ball plunger 550 may engage with grooves 555 to provide stepped rotation of the LED light head 520. Ball plunger 550 may be eliminated allowing LED light head 520 to rotate continuously within pan rotation ring 570 and support plate 420 using friction, thereby reducing the component count.

Figure 7:
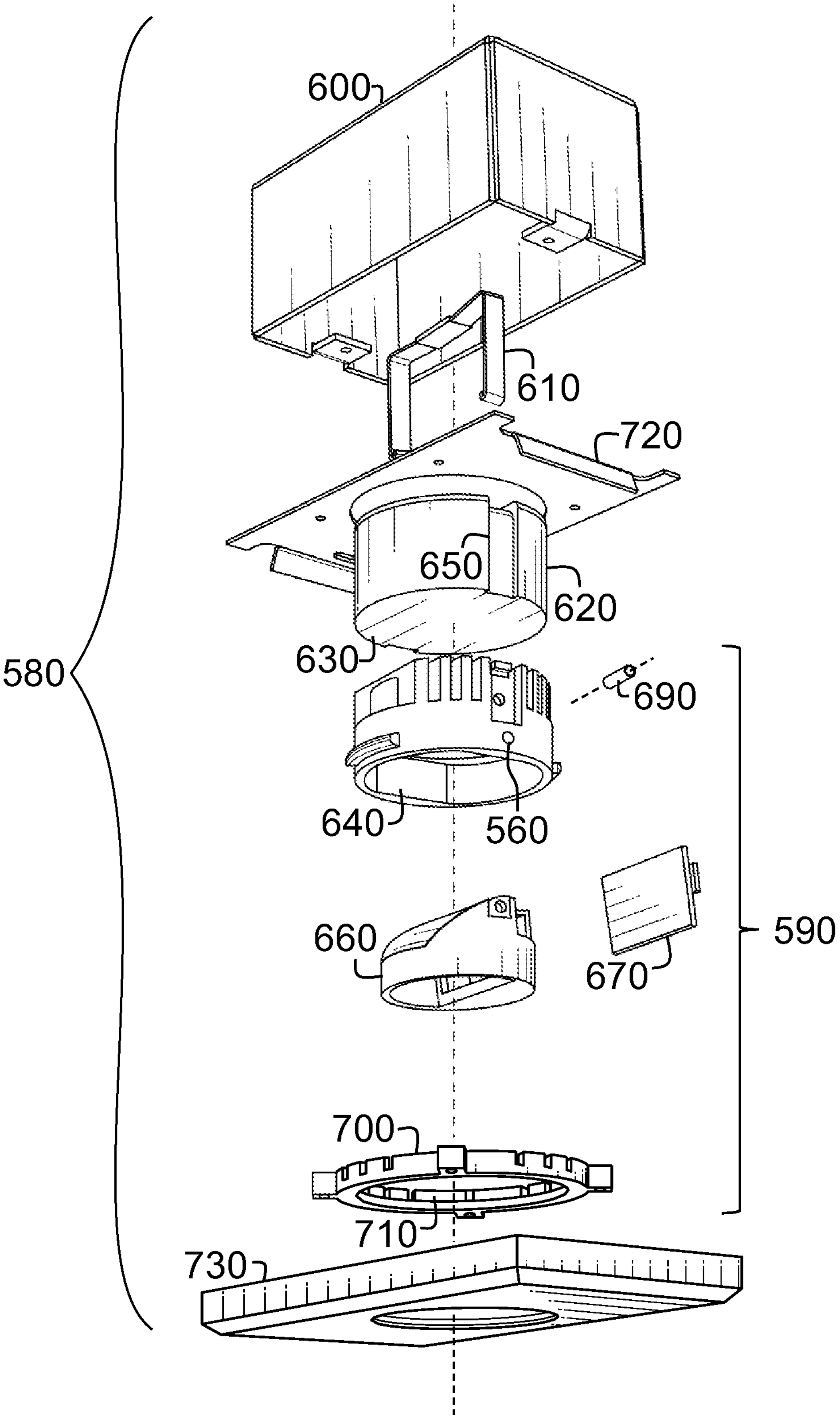
FIG. 7 is an isometric exploded view of a third embodiment of the present disclosure showing a round LED light head where the mechanism to include a complete and smooth rotation of the LED light head to achieve any angle of light from at least 0 to 90 degrees of pan rotation, and up to and including 90-180 degrees positions with no tilt adjustment.

FIG. 7 shows an isometric exploded view of an embodiment of the present disclosure showing a round LED step light 580. In such an embodiment, the rotation mechanism may include a complete and smooth rotation of the complete LED light head assembly 590 to achieve any angle of light from at least 0 to 90 degrees of pan rotation, and up to and including 90-180 degrees positions with a minor tilt adjustment. Going down the assembly from top to bottom, we have the following parts. Junction box 600 which may be a single pole handy gem electrical junction box 600 and may include knockouts (not shown) for an electrician to bring in power from the circuit breaker panel into the junction box 600 to power up the LED step light 580. Single-pole handy gem electrical junction box 600 may be deep enough to house all the remaining parts to follow. A heat-treated spring clip strap 610 may be provided to snap in and secure the driver box 620 and optional driver box cover 630 on top of reflector cover 640. A linear strap groove guide 650 can be seen on one side of driver box 620 which may facilitate the installation of spring clip strap 610 for a secure fit which may hold driver box 620 and optional driver box cover 630 on top of reflector cover 640. Spring clip strap 610 and strap groove guide 650 may be eliminated to reduce component count and simplify the design, instead using mounting screws to attach driver box 620 to top of reflector cover 640. A small electrical LED driver (not shown) may be housed inside driver box 620 and optional driver box cover 630, and may be potted or not with a thermal sealant (not shown). Two tilt screws (not shown) may be used to keep heat sink reflector 660 inside reflector cover 640 for tilt adjustment of heat sink reflector 660. Heat sink reflector 660 may include a lens 670 and an LED circuit board (not shown) with a thin pair of wires (not shown) leading from LED circuit board 680 into driver box 620 and optional driver box cover 630 to the internal LED driver (not shown). A single ball plunger 690 may be installed into reflector cover 640 to work with pan rotation ring 700. The spring actuated ball plunger 690 may come in contact with the outer rim surface 710 of pan rotation ring 700 for a smooth rotation of LED light head assembly 590. Main plate 720 may be fastened to junction box 600 using plate to junction box screws (not shown). Face cover plate 730 may attach to one end of main plate 720 and a locking set screw (not shown) may be used to hold face cover plate 730 securely to main plate 720 and may prevent movement and separation between these two parts. Ball plunger 690 may be eliminated allowing LED light head assembly 590 to rotate continuously within pan rotation ring 700 and main plate 720 using friction, thereby reducing the component count and simplifying the design and operation of LED step light 580.

Figure 8:
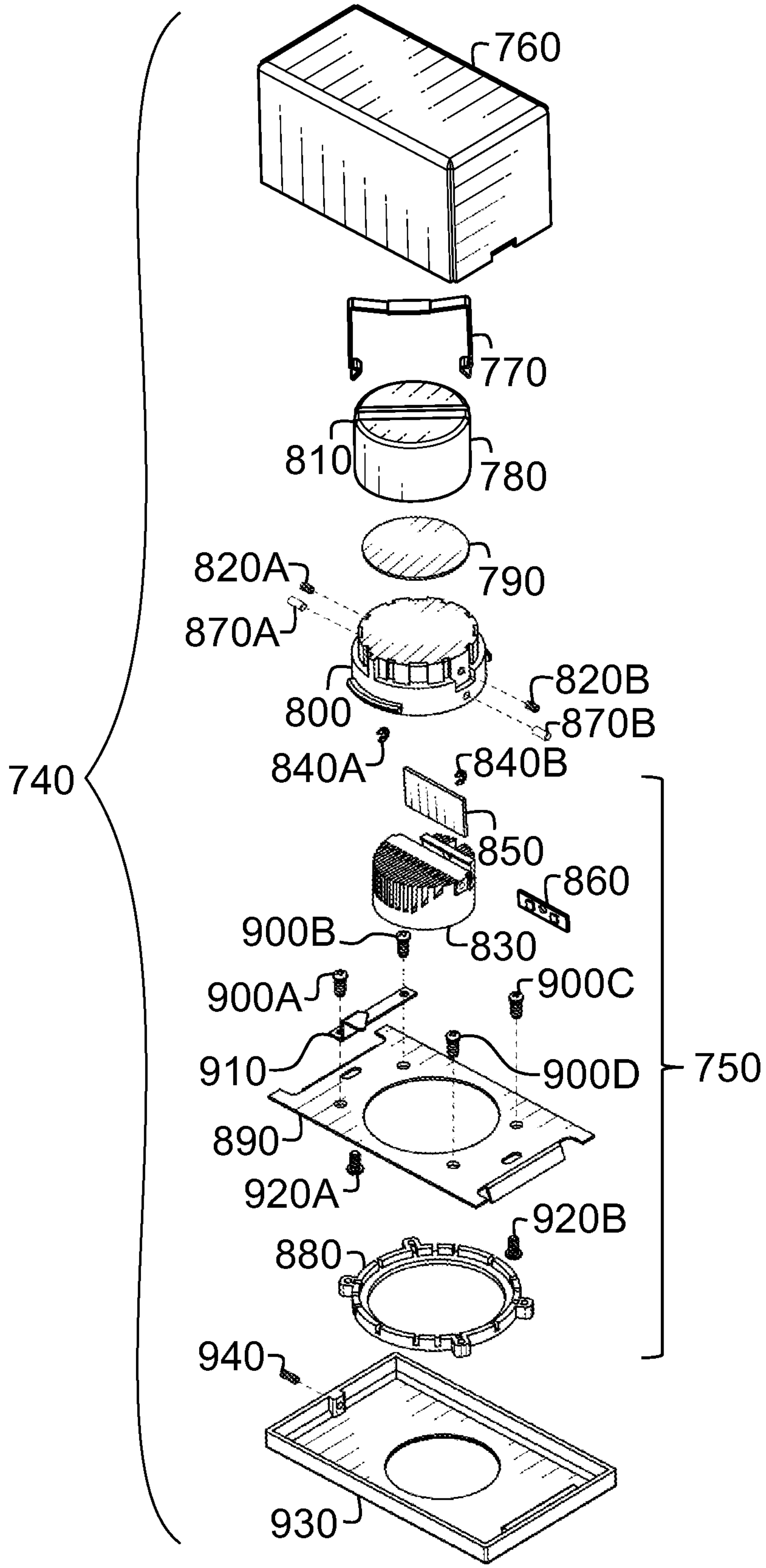
FIG. 8 is an isometric exploded assembly view of a fourth embodiment of the present disclosure showing a round LED light head with a tilt angle of 10-degrees total of the LED light head is provided to throw the light onto stairway steps with lengths from 36" up to 74" long as shown in FIG. 3 and FIG. 4 along with the detent pan rotation of less than 360-degrees of the LED light head. When installed in the center of the stair riser, the light can be tilted inwards for the illumination of the shorter step distance and pan rotated inwards and outwards for maximum light beam control.

FIG. 8 is an isometric exploded assembly view of an embodiment of the present disclosure. Such an embodiment may provide a tilt angle of up to 10-degrees of the LED step light 740 which may throw the projected light (not shown) onto stairway steps with lengths from 36" up to 74" long as shown in FIGS. 3 and 4, along with the detent pan rotations of less than 360-degrees of the LED light head assembly 750. When installed in the center of the stairway riser (not shown), the projected light (not shown) may be focused inwards to illuminate a shorter step throw distance to help reduce blinding glare. Likewise, the LED light head assembly 750 may be rotated left and right for maximum light beam control and focus projection on the stairway step surface (not shown).

Going down the assembly from top to bottom, we have the following parts for the LED step light 740 for an embodiment of the present disclosure. Junction box 760 may be a single-pole handy gem electrical junction box 760 which may include knockouts (not shown) for an electrician to bring in power from the circuit breaker panel into the junction box 760 which may power up the LED step light 740. Single-pole handy gem electrical junction box 760 may be deep enough to house all the remaining parts to follow. A heat-treated spring clip strap 770 may be provided to snap in and may secure the driver box 780 and optional driver box cover 790 on top of reflector cover 800. A linear strap groove guide 810 may be seen on top of driver box 780 to facilitate the installation of spring clip strap 770 for a secure fit to hold driver box 780 and optional driver box cover 790 on top of reflector cover 800. Spring clip strap 770 and strap groove guide 810 may be eliminated to reduce the component count and simplify the design, instead using mounting screws (not shown) to attach driver box 780 to top of reflector cover 800. A small electrical LED driver (not shown) may be housed inside driver box 780 and optional driver box cover 790 and may be potted or not with a thermal sealant (not shown). Two tilt screws 820A/820B may be used to keep heat sink reflector 830 inside reflector cover 800 for tilt adjustment of heat sink reflector 830. Two screw retainers 840A/840B each respectively to the two tilt screws 820A/820B may be secured in place to prevent them from failing out or coming loose. Heat sink reflector 830 may include a lens 850 and an LED circuit board 860 with a thin pair of wires (not shown) leading from LED circuit board 860 into driver box 780 and optional driver box cover 790 to the internal LED driver (not shown). Two detent ball plungers 870A/870B may be installed into reflector cover 800 to work with pan rotation ring 880. Pan rotation ring 880 may be installed onto main plate 890 with four pan ring screws 900A/900B/900C/900D. Two pan ring screws 900A/900B may be used to hold pan rotation stop bracket 910 onto main plate 890. Pan rotation stop bracket 910 may prevent the entire LED light head assembly 750 including heat sink reflector 830 housing LED circuit board 860 and lens 850 held inside reflector cover 800 to rotate less than 360-degrees and may prevent damage to the thin pair of wires (not shown) leading to the internal LED driver (not shown) from strain and twisting up. Main plate 890 may be fastened to junction box 760 using plate to junction box screws 920A/920B. Face cover plate 930 may attach to one end of main plate 890 and locking set screw 940 may hold face cover plate 930 securely to main plate 890 and may prevent movement and separation of these two parts. Ball plungers 870A/870B may be eliminated allowing LED light head assembly 750 to rotate continuously within pan rotation ring 880 and main plate 890 using friction, thereby reducing the component count and simplifying the design and operation of LED step light 740.

Figure 8A:
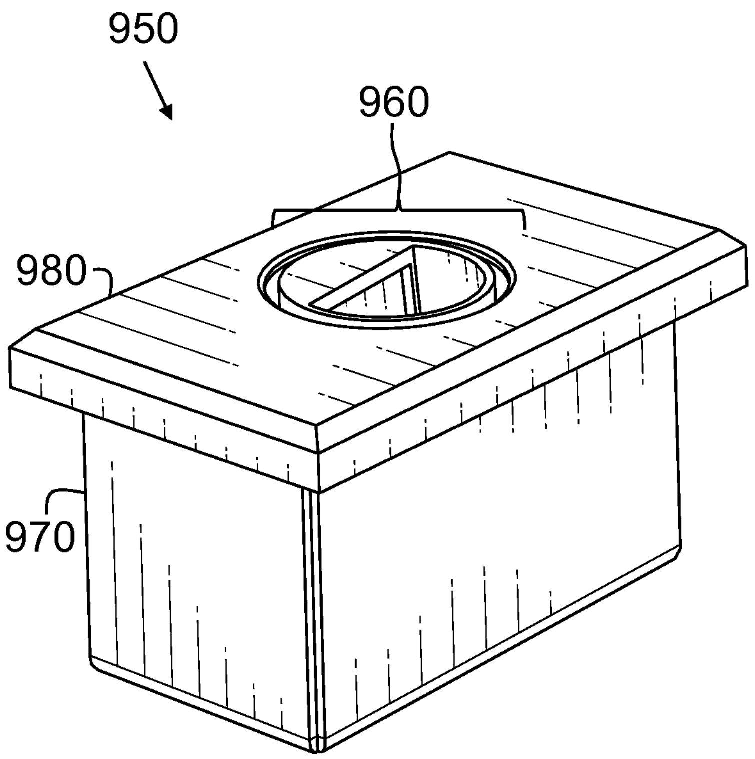
FIG. 8A is an isometric assembled front view of the fourth embodiment of the present disclosure showing a round LED light head with a tilt angle of 10-degrees total of the LED light head as described in FIG. 8.

FIG. 8A is an isometric assembled side view of an embodiment of the present disclosure showing a round LED light head assembly 750 which may include a tilt angle of up to 10-degrees (not shown) of the LED step light 740 as described in FIG. 8. FIG. 8A shows LED step light 950 with round LED light head assembly 960 installed inside junction box 970 with face cover plate 980 installed over round LED light head assembly 960. This embodiment may allow the LED light head assembly to have 360-degrees pan rotation and a total of 10-degrees of tilt adjustment.

Figure 9:
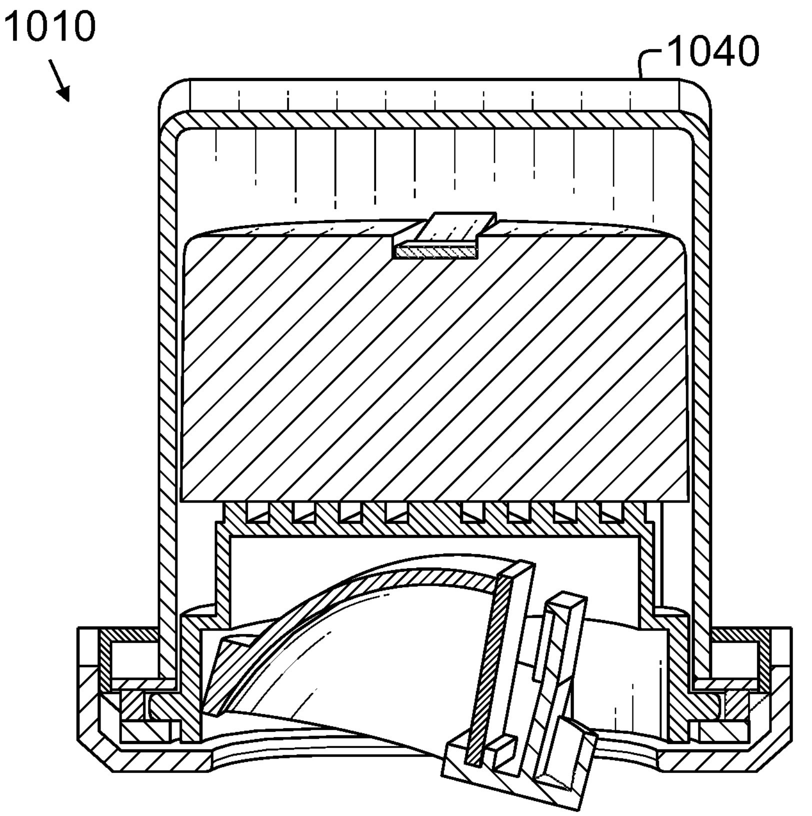
FIG. 9 is an isometric exploded assembly view of a fifth and final embodiment of the present disclosure showing a round LED light head with an outward tilt angle of up to 9-degrees of the LED light head is provided to long focus the light onto stairway steps with lengths from 36" up to 74" long as shown in FIG. 3 and FIG. 4 with no pan rotation of the LED light head. The LED light head is manually configured for either vertical or horizontal installation in a junction box.

FIG. 9 shows a close-up cross-sectional cut-out side view of an embodiment of the present disclosure showing a round LED light head assembly 1010 which may allow an outward tilt angle of up to 9-degrees of the LED light head assembly 1010 as shown. This may provide a long focus of the LED light onto stairway steps with lengths from 36" up to 74" long as shown in FIGS. 3-4, but now with no pan rotation of the LED light head assembly 1010. The LED light head assembly 1010 may be manually configured for either vertical or horizontal installation in junction box 1040.

Figure 9A:
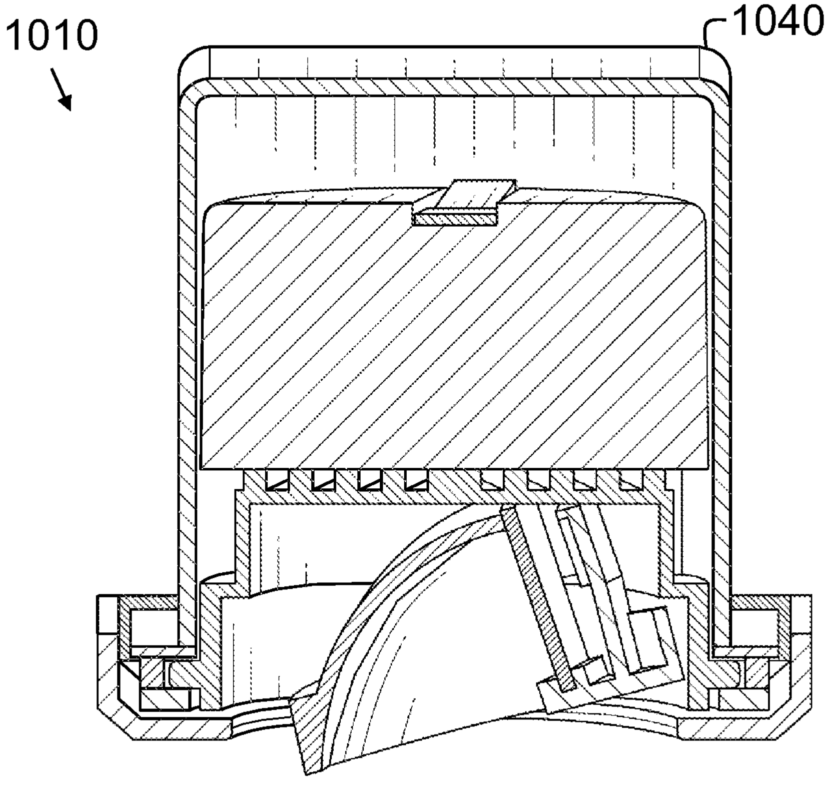
FIG. 9A is an alternate isometric exploded assembly view of a fifth and final embodiment of the present disclosure as described in FIG. 9, now showing a round LED light head with a slight inward tilt angle of up to 1-degree of the LED light head is provided to short focus the light onto stairway steps with lengths from 36" up to 74" long as shown in FIG. 3 and FIG. 4 with no pan rotation of the LED light head. The LED light head is manually configured for either vertical or horizontal installation in a junction box.

FIG. 9A is a close-up cross-sectional cut-out side view of an embodiment of the present disclosure as described in FIG. 9, now showing the round LED light head assembly 1010 with a slight inward tilt angle of up to 1-degree of the LED light head assembly 1010 to provide a short focus of the LED light onto stairway steps with lengths from 36" up to 74" long as shown in FIGS. 3-4, but now with no pan rotation of the LED light head assembly 1010. The LED light head assembly 1010 may be manually configured for either vertical or horizontal installation in a junction box 1040.

The LED step light 210/360/580/740/950 may include an LED dimmer circuit (not shown) to allow for adjustable dimming. The dimmer circuit may include a voltage regulator, a pulse width modulator, and an LED driver. The voltage regulator may be designed to provide a stable and constant voltage to the pulse width modulator, which may ensure that the output signal to the LED lights remains consistent and reliable. The pulse width modulator may be responsible for adjusting the duty cycle of the output signal to control the brightness of the LED step light 210/360/580/740/950. The LED driver may convert the output signal from the pulse width modulator into a current that is appropriate for the LED lights, which may provide smooth and efficient dimming without affecting the longevity of the LEDs. The LED dimmer circuit may be controlled via a physical switch, or wirelessly via a user device.

The LED step light 210/360/580/740/950 may include a color controller (not shown). The color controller may include a microcontroller, a color sensor, and a driver circuit. The microcontroller may receive inputs from the color sensor, which may be used to detect the color of a reference object. The microcontroller may then process this information and output a control signal to a driver circuit, which may adjust the brightness and color of the LED lights as desired. The LED color controller may also include the ability to store multiple color settings, enabling users to switch between different color schemes as desired. The LED color controller may also feature a user-friendly interface, making it easy to adjust the color of the LED lights. In an embodiment, the user-friendly interface is a physical switch. The physical switch may be located on a surface of the driver box 310/440/530/620/780. In another embodiment, the user-friendly interface is a software application. In such an embodiment, the LED step light 210/360/580/740/950 may include Bluetooth capability, and may wirelessly communicate with the software application to determine the color setting.

Other optional features for the LED step lights 210/360/580/740/950 of the present disclosure may include, Selectable CCT Color Temperature Control, Emergency Battery Backup during a power failure, solar renewable energy powered, wireless smart Wi-Fi unit identification and dimming control, and automatic extension during power-up and automatic retraction of the LED light head when power is disabled.

There may be other features that may be optionally included to the various embodiments of the present disclosures. For example, the LED step lights 210/360/580/740/950 may include conventional DC LED boards with remote dimmable AC drivers, or may be the latest low-profile AC DOB or Driver-On-Board type LED boards with V0 or 5VA fire rated protective lens cover barriers.

It will be understood that various changes in the details, materials, types, values, and arrangements of the components that have been described and illustrated in order to explain the nature of this invention may be made by those skilled in the art without departing from the principle and scope of the invention as expressed in the following claims.

What is claimed is:

1. An LED step light comprising:
a junction box;
an LED light head assembly, including:
a clip strap;
a driver box;
a driver box cover;
a reflector cover,
wherein the clip strap couples together the driver box, the driver box cover, and the reflector cover;
a heat sink reflector,
wherein the heat sink reflector is disposed within an interior of the reflector cover;
a pan rotation ring;
a ball plunger,
wherein the ball plunger is attached to the reflector cover, and is configured to interface with the pan rotation ring to allow for rotation of the LED light head assembly;
a main plate; and
a face cover plate.

2. The LED step light of claim 1, further comprising:
a dimmer circuit configured to allow for adjustable dimming of the LED step light.

3. The LED step light of claim 1, further comprising:
a color controller connected to the LED step light, the color controller configured to adjust the color of the LED step light.

4. The LED step light of claim 3, wherein the color controller is operated by a physical switch located on a surface of the driver box.

5. The LED step light of claim 3, further comprising:
a dimmer circuit connected to LED light sources and a power source, the dimmer circuit configured to adjust the brightness of the LED light sources.

6. The LED step light of claim 5, wherein the dimmer circuit and the color controller are integrated into a single unit.

7. The LED step light of claim 5, wherein the color controller is operated by a physical switch located on a surface of the driver box.

8. The LED step light of claim 6, wherein the color controller is operated by a physical switch located on a surface of the driver box.

9. An LED step light comprising:
a junction box;
an LED light head assembly, including:
a driver box;
a driver box cover;
a reflector cover,
a heat sink reflector,
wherein the heat sink reflector is disposed within an interior of the
reflector cover;
a pan rotation ring;
a main plate,
wherein the main plate facilitates rotation of the LED light head assembly within
the pan rotation ring; and
a face cover plate.

10. The LED step light of claim 9, further comprising:
a dimmer circuit configured to allow for adjustable dimming of the LED step light.

11. The LED step light of claim 10, further comprising:
a color controller connected to the LED step light, the color controller configured to adjust the color of the LED step light.

12. The LED step light of claim 11, wherein the color controller is operated by a physical switch located on a surface of the driver box.

13. The LED step light of claim 12, further comprising:
the dimmer circuit connected to LED light sources and a power source, the dimmer circuit configured to adjust the brightness of the LED light sources.

14. The LED step light of claim 13, wherein the dimmer circuit and the color controller are integrated into a single unit.

15. The LED step light of claim 14, wherein the color controller is operated by a physical switch located on a surface of the driver box.

16. An LED step light comprising:
a junction box;
an LED light head assembly, including:
a driver box;
a reflector cover,
a heat sink reflector,
wherein the heat sink reflector is disposed within an interior of the reflector cover and allowing tilt rotation of the LED light head;
a pan rotation ring;
a main plate,
wherein the main plate facilitates rotation of the LED light head assembly within the pan rotation ring; and
a face cover plate.

17. The LED step light of claim 16, further comprising:
a dimmer circuit configured to allow for adjustable dimming of the LED step light.

18. The LED step light of claim 16, further comprising:
a color controller connected to the LED step light, the color controller configured to adjust the color of the LED step light.

19. The LED step light of claim 18, wherein the color controller is operated by a physical switch located on a surface of the driver box.

* * * * *